United States Patent
Bennett et al.

(10) Patent No.: US 11,080,392 B2
(45) Date of Patent: Aug. 3, 2021

(54) METHOD FOR SYSTEMATIC COLLECTION AND ANALYSIS OF FORENSIC DATA IN A UNIFIED COMMUNICATIONS SYSTEM DEPLOYED IN A CLOUD ENVIRONMENT

(71) Applicant: Government of the United States as represented by the Secretary of the Navy, San Diego, CA (US)

(72) Inventors: Juan Carlos Bennett, Temecula, CA (US); Mamadou H. Diallo, Santee, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 231 days.

(21) Appl. No.: 16/508,103

(22) Filed: Jul. 10, 2019

(65) Prior Publication Data

US 2021/0011999 A1 Jan. 14, 2021

(51) Int. Cl.
*G06F 21/00* (2013.01)
*G06F 21/55* (2013.01)
*G06F 16/17* (2019.01)
*G06F 21/56* (2013.01)

(52) U.S. Cl.
CPC ........ *G06F 21/552* (2013.01); *G06F 16/1734* (2019.01); *G06F 21/554* (2013.01); *G06F 21/566* (2013.01); *G06F 21/567* (2013.01)

(58) Field of Classification Search
CPC .... G06F 21/552; G06F 21/554; G06F 21/566; G06F 21/567; G06F 16/1734; H04L 63/14; H04L 63/1408; H04L 63/1425; H04L 63/30; H04L 63/302; H04L 63/308
See application file for complete search history.

(56) References Cited

U.S. PATENT DOCUMENTS

| 9,773,052 B2 | 9/2017 | Onusko et al. |
| 2012/0204261 A1* | 8/2012 | Mantripragada ....... H04L 12/66 726/22 |
| 2014/0173731 A1* | 6/2014 | Mantripragada ... H04L 12/6418 726/22 |

(Continued)

OTHER PUBLICATIONS

A. Agarwal, M. Gupta, S. Gupta, and S. C. Gupta. Systematic digital forensic investigation model. International Journal of Computer Science and Security (IJCSS), 5(1):118-131, 2011.

(Continued)

*Primary Examiner* — Edward Zee
(74) *Attorney, Agent, or Firm* — Naval Information Warfare Center, Pacific; Kyle Eppele; J. Eric Anderson

(57) ABSTRACT

A method for systematic collection and analysis of forensic data in a unified communications system deployed in a cloud environment. Three primary forensic components, namely, evidence collectors, a forensic controller and self-forensic investigators, are utilized in the method to interface with the components of the cloud environment and of the unified communications network. The method invokes a cloud evidence collection process which collects footprint data structures continuously at runtime to enable effective real-time collection of cloud forensic evidence and a cloud evidence analyzing process which generates evidence data that can be consumed by standard forensics tools.

3 Claims, 4 Drawing Sheets

(56) References Cited

U.S. PATENT DOCUMENTS

| | | |
|---|---|---|
| 2014/0317681 A1 | 10/2014 | Shende |
| 2016/0020959 A1 | 1/2016 | Rahaman |
| 2016/0034295 A1 | 2/2016 | Cochran |
| 2019/0044966 A1* | 2/2019 | Vega ................. G06F 21/56 |

OTHER PUBLICATIONS

A. D. Tesfamicael, V. Liu, and W. Caelli, Performance analysis of secure unified communications in the vmware-based cloud. In Computational Intelligence and Communication Networks (CICN), 2015 International Conference on, pp. 1135-1140. IEEE, 2015.

B. Carrier and E. H. Spafford. An event-based digital forensic investigation framework. In Digital forensic research workshop, pp. 11-13, 2004.

B. Martini and K.-K. R. Chop. An integrated conceptual digital forensic framework for cloud computing. Digital Investigation, 9(2):71-80, 2012.

D. Tesfamicael, V. Liu, and W. Caelli. Design and implementation of unified communications as a service based on the open stack cloud environment. In Computational Intelligence & Communication Technology (CICT), 2015 IEEE International Conference on, pp. 117-122. IEEE, 2015.

H. Chung, J. Park, S. Lee, and C. Kang. Digital forensic investigation of cloud storage services. Digital investigation, 9(2):81-95, 2012.

H. Lin, Z. Yan, Y. Chen, and L. Zhang. A survey on network security-related data collection technologies. IEEE Access, 6:18345-18365, 2018.

I. O. Ademu, C. O. Imafidon, and D. S. Preston. A new approach of digital forensic model for digital forensic investigation. Int. J. Adv. Comput. Sci. Appl, 2(12):175-178, 2011.

J. C. Pelaez and E. B. Fernandez. Network forensics models for converged architectures. 2010.

J. Dykstra and A. T. Sherman. Design and implementation of frost: Digital forensic tools for the openstack cloud computing platform. Digital Investigation, 10:S87-S95, 2013.

J. Parry, D. Hunter, K. Radke, and C. Fidge. A network forensics tool for precise data packet capture and replay in cyber-physical systems. In Proceedings of the Australasian Computer Science Week Multiconference, ACSW '16, pp. 22:1-22:10, New York, NY, USA, 2016. ACM.

K. Kent, S. Chevalier, T. Grance, and H. Deng. Guide to integrating forensic techniques into incident response, NIST Special Publication, 10:800-86, 2006.

K. Ruan, J. Carthy, T. Kechadi, and M. Crosbie. Cloud forensics. In IFIP International Conference on Digital Forensics, pp. 35-46. Springer, 2011.

L. Braun, A. Didebulidze, N. Kammenhuber, and G. Carle. Comparing and improving current packet capturing solutions based on commodity hardware. In Proceedings of the 10th ACM SIGCOMM Conference on Internet Measurement, IMC '10, pp. 206-217, New York, NY, USA, 2010. ACM.

M. Damshenas, A. Dehghantanha, R. Mahmoud, and S. bin Shamsuddin. Forensics investigation challenges in cloud computing environments. In Cyber Security, Cyber Warfare and Digital Forensic (CyberSec), 2012 International Conference on, pp. 190-194. IEEE, 2012.

M. Köhn, M. S. Olivier, and J. H. Eloff. Framework for a digital forensic investigation. In ISSA, pp. 1-7, 2006.

M. Roesch. Snort—lightweight intrusion detection for in Proceedings the 13th USENIX Conference on System Administration, LISA '99, pp. 229-238, Berkeley, CA, USA, 1999. USENIX Association.

Nist. Nist cloud computing forensic science challenges. Jun. 2014.

R. van Donselaar. Spem: A software pattern evaluation method. Master's thesis, 2014.

S. R. Selamat, R. Yusof, S. Sahib. Mapping digital forensic investigation framework. International Journal of Computer Science and Network Security, 8(10):163-169, 2008.

* cited by examiner

METHOD FOR SYSTEMATIC COLLECTION AND ANALYSIS OF FORENSIC DATA IN A UNIFIED COMMUNICATIONS SYSTEM DEPLOYED IN A CLOUD ENVIRONMENT

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil. Reference Navy Case No. 109,218.

BACKGROUND OF THE INVENTION

Field of the Invention

This disclosure relates generally to the forensic collection and analysis of digital evidence in Unified Communications as a Service ("UCaaS") architectures.

Description of the Prior Art

Digital forensic analysis and investigation techniques have been the cornerstone for assessing and diagnosing attacks when they occur in networked systems and applications, including in Unified Communications ("UC") systems. In a networked environment, attacks cannot be completely avoided, so it is necessary to have appropriate forensics systems. Network forensics adds another layer of protection to such a system.

Various digital forensic investigation frameworks, models, and tools have been developed and/or deployed. The forensic analysis of data collected from the network permits investigators to reconstruct network activities for a given period of time. Once the network activities are reconstructed, the investigators can isolate the specific incidents and identify the individuals involved. The systems and tools used by the investigators include intrusion detection systems ("IDS") such as Snort® and the Advanced Intrusion Detection Environment ("AIDE"), packet capture tools, and network data collectors. Often, the approach taken by system developers has been to install the data collection tools into the network infrastructure, which are then used to monitor the activities of network packets coming in and out of the network, and log the activities. The logged data are then used for the forensic analysis by the investigators.

Although forensic analysis and investigation techniques are being developed to understand and diagnose attacks in a cloud environment (or "cloud computing environment"), cyber forensics remain a growing concern in today's cloud systems. This is especially due to the increasing number of complex and heterogeneous systems and highly connected devices, and lack of existing tools and algorithms to protect these resources against attacks and to conduct investigations when attacks occur. Thus, developing techniques for cloud-based systems and applications can be more challenging due precisely to the nature of the cloud environment. For example, deployment models of cloud computing services may be characterized as infrastructure as a service (IaaS), platform as a service (PaaS), and software as a service (SaaS) based on the levels of control that users have on the cloud infrastructure, and each of said models may require different techniques for collecting and analyzing evidence.

Nonetheless, it is inescapable that the forensic information that can be found in cloud systems has a great potential to be used as evidence.

UCaaS systems based on a SaaS model have been used in UC systems deployed in a cloud environment. The UCaaS model is a cost-effective model for on-demand delivery of unified communications services in the cloud for meeting the needs of enterprise level information technology ("IT") services. UCaaS combines substantially all communication services, such as voice and video over IP ("VVoIP"), and collaboration services (e.g. instant messaging), into an integrated framework hosted in the cloud. But collecting forensic information in a UCaaS environment is more challenging relative to even the other cloud computing deployment models due to the diversity of cloud offerings, the complexity of the systems, and the limited controls customers have in cloud infrastructure.

In all, while the implementation of UC technology in any cloud networking environment may bring both network architecture and forensic challenges to users, due to the limited control users have in the SaaS model of the cloud, collecting evidence through such a cloud infrastructure is exceedingly complex. Thus, an investigator desiring to collect and analyze evidence in a UCaaS system often has to negotiate with an applicable cloud service provider ("CSP") in order to get the CSP to run forensic tools on their behalf, or even go through the trouble and expense of developing their own cloud infrastructure to host their UCaaS.

Accordingly, there remains a need for a method which provides a structured process that allows for the collection of more and better forensic evidence from cloud-based UC systems and the reduction of the time required to analyze such forensic evidence. It would be desirable for such a method to allow network investigators to specify, analyze and implement network forensic investigations for technologies under the UC umbrella that are deployed under a SaaS model.

SUMMARY OF THE INVENTION

The present disclosure describes a method which provides a structured process that allows for the collection of more and better forensic evidence from cloud-based UC systems and the reduction of the time required to analyze such forensic evidence. In accordance with the present disclosure, a method for systematic collection and analysis of forensic data in a unified communications system deployed in a cloud environment, comprising the steps of: integrating at least one evidence collection mechanism with the cloud environment, wherein said at least one evidence collection mechanism is operative to capture forensic data related to the operation of the unified communications system and at least one component in the cloud environment; generating at least one model which captures the normal behavior of the unified communications system; monitoring, by at least one intrusion detection system, the unified communications system for an occurrence of an unauthorized action using captured said forensic data and the at least one model; upon the occurrence of an unauthorized action, transmitting, by said at least one intrusion detection system, an alarm to a forensic controller; upon the transmission of the alarm to said forensic controller, collecting, by said at least one evidence collection mechanism, said forensic data; building, by said forensic controller, at least one footprint data structure from the collected forensic data; and formatting said at least one footprint data structure, wherein the step of formatting enables said at least one footprint data structure to be used by at least one forensics software application tool.

DETAILED DESCRIPTION OF THE INVENTION

Described herein is a method for systematic collection and analysis of forensic data in a UC system deployed in a cloud environment. The method for systematic collection and analysis of forensic data in a UC Repository cloud environment may be employed through a cloud evidence collection process, a pattern building cloud evidence analyzing process, and a detection cloud evidence analyzing process and is suitable for network forensic investigations for the converged network, where a single IP is to transmit a combination of voice, video, and/or data services. The cloud evidence collection process operates to collect UCaaS evidence that is defined by digital evidence in UC SaaS architectures from a commercial provider of cloud computing services and software. As discussed below, the cloud evidence analysis process operates to define patterns which represent normal behaviors for UC system components of the UCaaS Network. The cloud evidence analyzing process then operates to forensically analyze collected UCaaS evidence in light of the defined patterns to detect abnormal behaviors.

It is appreciated that the UCaaS concept will include a virtual desktop, the absolute minimum internal infrastructure (e.g: wire, switches and routers on premises) with all other network services being provided from components in the cloud environment as a commodity. The cloud evidence collection process may operate in a multi-tenant cloud hosting environment, where data is stored on public, virtually or physically separated infrastructures. In this regard, customers data, systems and applications will be logically separated between tenants at a minimum and evidence is being preserved securely. Additionally, it is contemplated that the users in the monitored network will be unaware of both the evidence collection and analysis processes.

Figure 1:
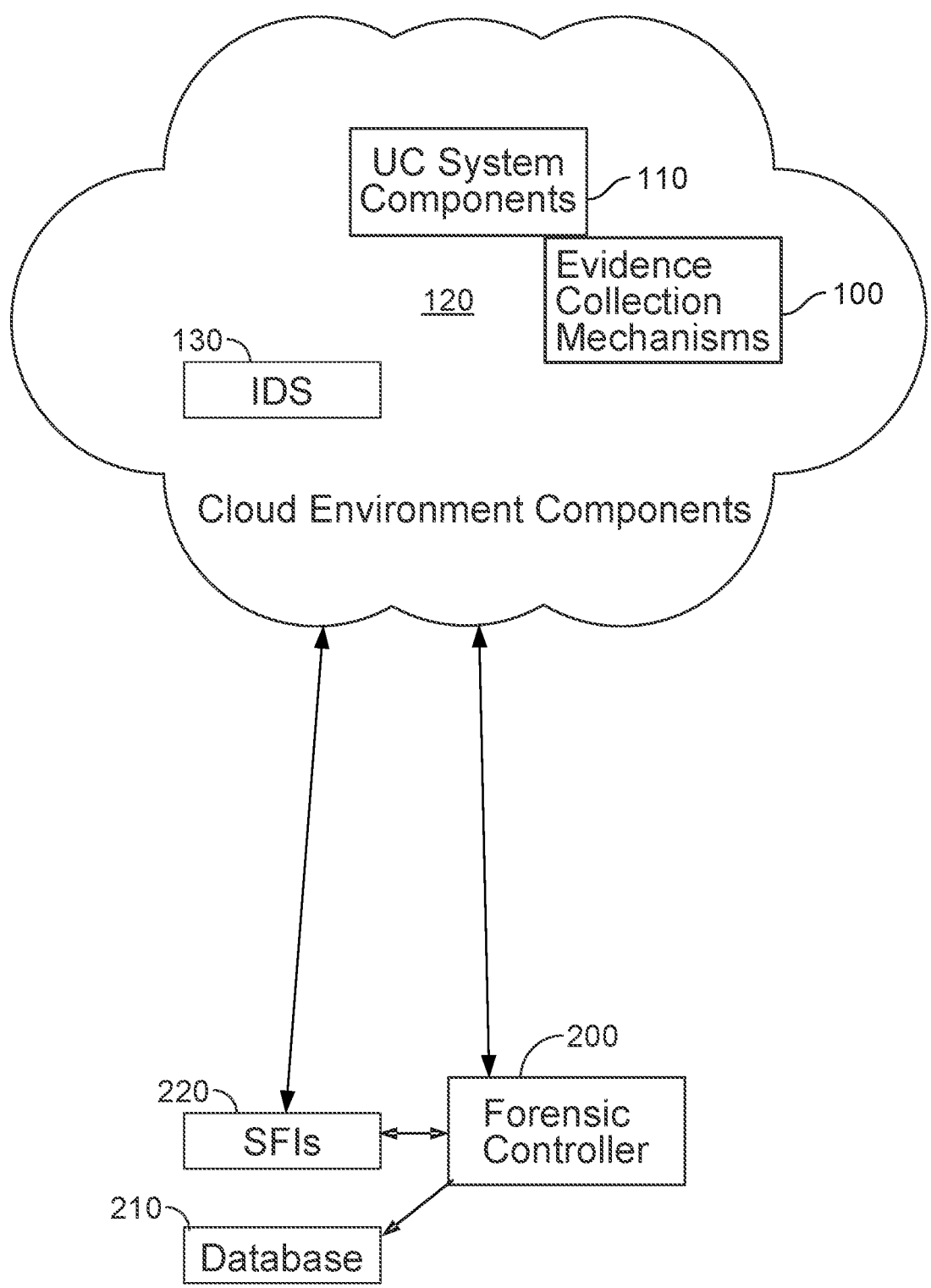
FIG. 1 shows a block diagram of the architecture of a method for systematic collection and analysis of forensic data in a UC system deployed in a cloud environment in accordance with the present disclosure.
Figure 2:
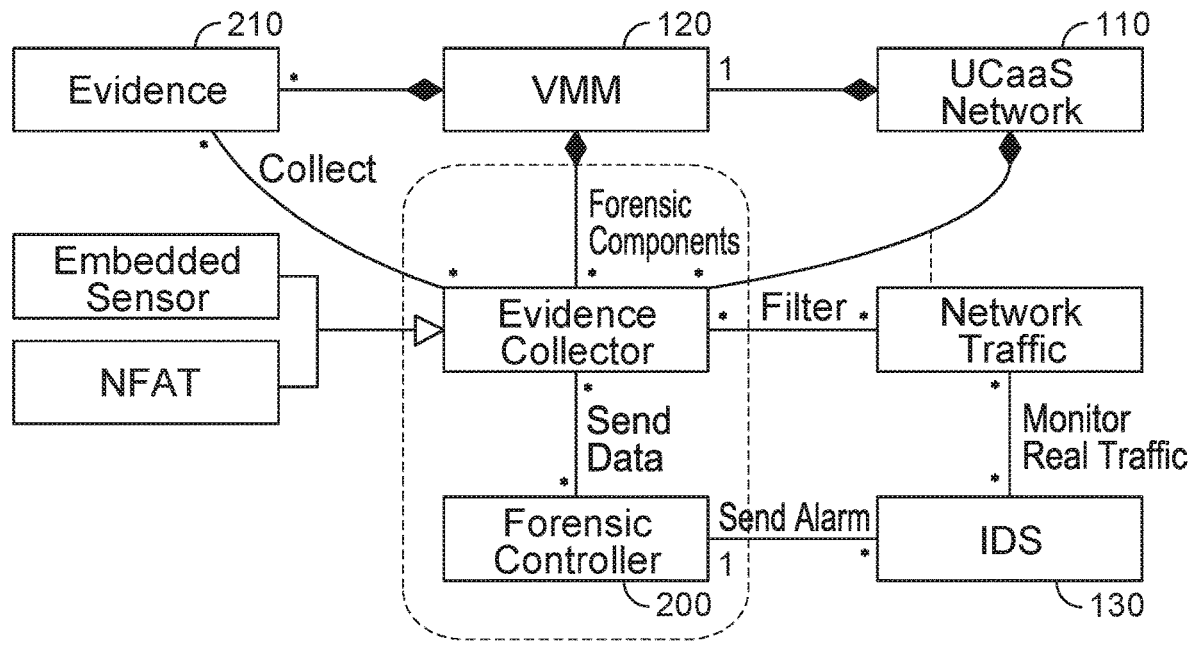
FIG. 2 is a Unified Modeling Language class diagram of the components of a cloud evidence collection process in accordance with the present disclosure.
Figure 3:
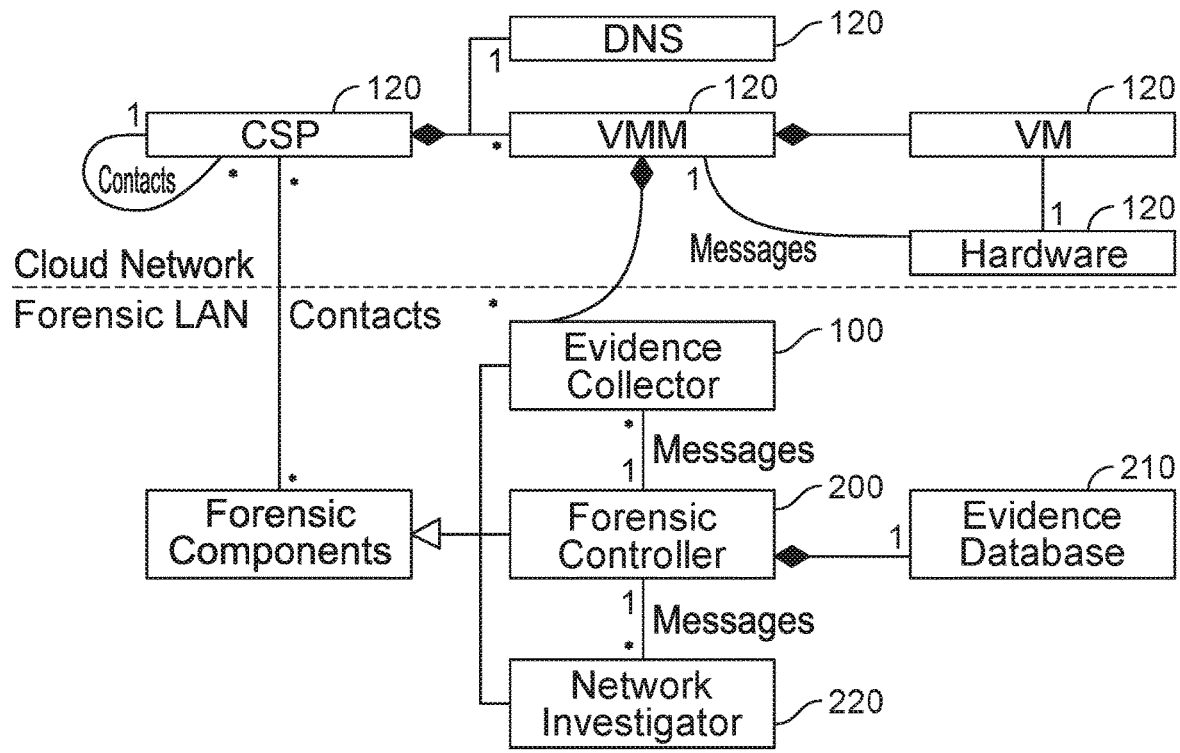
FIG. 3 is a Unified Modeling Language class diagram of the components of a cloud evidence analyzing process in accordance with the present disclosure

Referring now to FIGS. 1, 2, and 3, the cloud evidence collection process utilizes a plurality of evidence collection mechanisms 100 which collect details about the normal operation of the UC system components of the UCaaS Network 110 ("UC system components")(e.g., Call Manager). The evidence collection mechanisms 100 further collect details about any attacker activities against UC system components of the UCaaS Network 110 and the corresponding signaling packets on the UCaaS network and send them to the forensic controller 200. The forensic controller 200 is a mechanism that combines, analyzes, and stores the collected evidence data in a knowledge repository (such as the database 210) for real-time response.

The cloud evidence collection process must be operating to collect forensic data in a conventional cloud environment 120. It is contemplated that the cloud environment 120 may include conventional cloud environment components such as a Domain Name System ("DNS") service, a CSP, a VMM, one or a plurality of VMs, and system hardware (each of which may be referred to with the reference character 120).

In order to effectively collect cloud forensic evidence and digital attack evidence in real-time from a UC system using a SaaS model in the cloud environment 120, the cloud evidence collection process collects footprint data structures continuously at runtime. To this end, the cloud evidence collection process may utilize embedded sensors with forensic capabilities and Live Forensic Evidence Collectors ("LFECs") as evidence collection mechanisms 100 for real time evidence collection in the converged cloud environment. Advantageously, this reduces the investigation time in cloud communication incidents and also provides shorter response times to anomalous events to stop and/or prevent rapid propagation of complex attack strategies and mitigate their impacts on normal system operations and UC services.

The embedded sensors may be attached to potential target servers and/or key UC components in order to capture all UC packets (i.e., signaling, media and control) entering or leaving the cloud system. UC evidence may be collected using automation, and the sensors may capture packets by mirroring the traffic flowing through targeted servers and/or key cloud component. These sensors are also used by an integral IDS 130 to monitor the cloud architecture. The embedded sensors may be defined by NetFlow and IPFIX sensors, sFlow sensors, jFlow sensors, and so forth.

The cloud evidence analyzing process defines patterns in the form of data structures to analyze the forensic data collected by the cloud evidence collection process and stored in a database 210. The pattern describe the normal behavior of the UC system components (e.g. users, applications, servers, protocols or any network device) and their interactions to generate fine-grained data structures to serve as models. An example of a normal behavior could be based on the patterns in which a user presses the keystroke on the keyboard to log in to an application. Another example of a normal behavior could be the network or disk activities on the UC network for a given period of time, such as activities in the morning versus in the afternoon or activities during the weekdays versus during the weekends.

Finite-state machines may be employed to model and encode the patterns to capture deterministically the behaviors of the UC system components and their interactions. Finite-state machines allow for the definition of the different states the components can be during their normal operations of the cloud system as a result of external inputs as well as the identification of the transitions from one state to another. Through the patterns encoded, a baseline of the normal behaviors of the UC system components can be established and abnormal behaviors will be revealed if the normal sequences in the finite-state machines are violated.

While the infrastructure to detect abnormal behaviors is ongoing, evidence may also be collected as a part of the cloud evidence collection process so that a suitable response to abnormal behaviors may be rapidly deployed. To this end, LFECs may be attached to key cloud components (e.g., Virtual Machine Manager or VMM) to survey the network in order to obtain useful information (evidence), such as the attacker location. Conventional packet analyzers may be employed as LFECs. Collected data from these LFECs is authenticated through the use of fingerprinting metadata associated with each device. LFECs will also scan the network for mapping topology to find, for example, a false proxy server, or traceback the location of the attacker.

As forensic data is collected using embedded sensors attached to compromised UC components to capture and process system logs and volatile memory, through the LFECs, UCaaS components that are monitored can provide forensics information once an attack occurs. The evidence collection mechanisms 100 work within the UC system components 110 and the volatile memory allocated to it to supply the data for both purposes. Still, they will not compromise other customers' information or VMs running on the same physical hardware which may be a concern for other tools. In addition, Network Forensic Analysis Tools ("NFATs") work with the data from the evidence collection mechanisms to extract raw network traffic data used to discover and reconstruct attacking behaviors. An open source NFAT, such as Xplico, may be employed to extract applications data contained in an Internet traffic capture. For example, from a ".pcap" file created by a packet analyzer, an NFAT may be able to extract each email (POP, IMAP, and SMTP protocols), all HTTP contents, each VoIP call (SIP), FTP, TFTP, and so forth.

The cloud evidence collection process is designed to extract forensic data with the LFECs, embedded sensors and NFATs and securely transport it (i.e., hash and encrypt) to a forensic controller 200 using a VoIP secure channel. The forensic controller combines the logs collected from the target servers and the UCaaS network and stores them in the database 210 to allow queries via command user interfaces. The collected information may be also used to build the following forensic data structures: Users Forensic Footprint ("UFF"), Application Forensic Footprint ("AFF"), Server Forensic Footprint ("SFF"), Protocol Forensic Footprint ("PFF") and Devices Forensic Footprint ("DFF"). The network forensic controller 200 also controls the operation of the LFECs.

The IDS 130 is a software module that is based on anomaly behavior analysis and uses collected data to accurately detect attacks, classify the attacks, and track the location of the attacker once the attack has been detected. The IDS 130 uses statistical and probability techniques associated with temporal protocol transitions to perform such detection, classification, and tracking. When the IDS 130 detects any attempt to illegally use the UC system or a known attack against UC components, it gives alarms to the forensic controller 200, which in turn makes the evidence collectors start collecting forensic data (if they are not already collecting it). The cloud evidence collection process then collects and combines the forensic information from several information sources in the cloud environment 120 under investigation. It will also filter out certain types of evidence to reduce redundancy. For example, when a CSP or data owner IDS 130 detects a UC-incident within the converged cloud infrastructure, the forensics system initiates the collection and preservation of UC evidence. CSP then reports all known affected cloud components (e.g. servers, terminal devices) supporting the UCaaS system and the data owner. The forensics system also preserves and protects all relevant network logs, as well as all available network monitoring and packet capture data. Potential UC evidence includes system logs, volatile memory captures, and hard drive (physical or virtual) images. The CSP also shares the collection results from key UC system components 110 and attacking sources with the data owner.

When digital UC evidence is collected from the UCaaS system, the original and copied data is hashed to validate the integrity of the copy. The forensic system then encrypts the evidence to preserve its confidentiality and integrity. The CSP must provide an automated capability that supports evidence collection and preservation, which must support the CSP's investigation of attacks within their own infrastructure and in multi-tenant environments. An interface to the capability must be made available to the data owner (i.e. customer) in support of the customer's incident response activities UC network forensics automation must capture the desired evidence in such a way that isolates collected data by customer.

In order to maintain efficiency when capturing network traffic, the data to save, such as source and destination addresses and ports, a protocol type is selected. The evidence collection mechanisms 100 can then extract all or selective UC packets (i.e., incoming or outgoing) over the UC system components 110 by applying a filter. The database 210 of the forensic controller 200 will store the data sent by evidence collectors of the evidence collection mechanisms 100 in order to perform the corresponding forensics analysis. Network segmentation techniques may be used to monitor the voice or video VLAN traffic independently from data VLAN traffic although the two share the same converged network.

On the other hand, when conducting live data forensics, the methods used in data collection may result in changes to the UC system components 110. The drawback of this approach is that the suspect device must remain on in order to collect volatile evidence. Additionally, the suspect operating system must be used to access the needed evidence.

When an attack is detected by operation of the cloud evidence collection process, attack details are collected and handled in a manner that will support legal prosecution if needed. Likewise, such evidence is preserved from the time it is collected until it is no longer needed.

The cloud evidence analysis process operates to analyze UCaaS evidence identified and extracted by the cloud evidence collection process in order to discover the attack source and other characteristics of the attack. To do this, the cloud evidence analysis process results in the generation of evidence data in a form that can be used by standard forensics software application tools such as EnCase or Forensic Toolkit ("FTK") which are distributed to run in the cloud. These forensics tools and standards may be compatible with cloud UCaaS characteristics of on-demand, self-service, rapid elasticity, and scalability. By being positioned in the cloud, the forensics software application tools take advantage of cloud based relational database services to store forensics data efficiently.

Once the normal behaviors of the UC system components and their interactions are modeled using finite-state machines, these models may be deployed by the cloud evidence analysis process to analyze collected evidence data. Based on the finite-state machines modeling of the normal behaviors of the UC system components and their interactions, self-forensic investigators ("SFI") 220 may be generated to efficiently detect any abnormal behaviors. A further analysis of the abnormal behaviors will detect the malicious behavior in the UC system components and initiate more details investigations.

By using a separate UC forensics system to support UCaaS misuse investigations with a centralized correlated view across all of the traffic logs, network attacks, and UC applications related to a specific user session, the cloud evidence analysis process provides for integrated analysis and a centralized management for system logging activities. Network analysts will then be able to use the relevant tools and analysis methods to develop detection signatures and mitigation measures to be applied to converged networks and UC enterprise's systems. Network analysts must, however, take in consideration the segregation of duties among UC users and the lack of transparency of log data for the consumer.

In accordance with the present disclosure, there are three primary forensic components: the evidence collection mechanisms 100, the forensic controller 200 and the SFIs 220. The evidence collector of the evidence collection mechanisms 100 is attached to a host that may be attacked in the UCaaS model (e.g., Virtual Machine Monitor). The forensic controller 200 is operative to combine the logging information collected from the components of the cloud environment 120 and its key components, and storing it in the evidence database 210. And the SFIs acquire information about attackers and their sources and are used to automatically recognize and investigate anomalous behaviors. Machine learning and multi-level anomaly behavior analysis use the footprint data structures to generate SFIs that can detect any malicious behavior or non-self behavior in UC components (users, apps, servers, protocols or any network device) and initiate the corresponding investigation, without any human intervention.

Advantageously, when using the processes disclosed herein for network forensics automation, the UCaaS infrastructure and forensic system may be seamlessly managed with little involvement by users, administrators and forensics investigators. As such, the automated system seamlessly acquires information about attackers and their sources by using network forensics techniques to conduct further investigations and stop and/or mitigate the impacts of threats and cyberattacks.

The cloud evidence analysis process operates to combine, reduce and normalize the forensic fingerprints (e.g. logging information) collected from the cloud converged network and its key components, and store it in the evidence database 210 (i.e. forensic data repository). This entails analyzing the collected evidence using machine learning and multi-level anomaly behavior analysis. Forensic data structures, namely UFF, AFF, SFF, PFF and DFF are built, processed, and converted into existing forensic formats to be easily ingested by other forensic tools. UFF trace users to actions, identifying the particular user who took an action on a particular date at a particular time. AFF record activity generated by the UC applications along with errors and other operational faults of the applications. SFF are the records of interactions between UC services and the underlying operating system. PFF records the structure and normal behavior of application and network protocols (e.g. TCP/IP) to discern the evidence associated with an anomalous event. DFF helps to identify traffic patterns by capturing and recording source and destination IP addresses, TCP ports, and relevant network device information. The raw traffic data is also converted into a readable format and stored in a separate database.

These forensic data structures may then be employed to generate the SFIs 220 that are used to detect any malicious behavior in UCaaS components (e.g. users, apps, servers, protocols or any network device) and initiate the corresponding investigation. In this regard, malicious behavior will be immediately detected by the SFIs 220, and the SFIs 220 generate alerts that are sent to the forensic controller and then are stored in an alerts and policy database (e.g., the database 210). Forensic evidence may also be compared with the set of predefined attack patterns in addition to or as opposed to the models of normal behavior to identify possible security violations.

The forensic controller 200 uses the alert and policy information in this alerts and policy database to determine the appropriate recovery actions to be taken in response to each alert. To reduce the false alarms, especially for malicious behavior, the detection of malicious behavior will launch the Challenge/Response application that forces the user to prove "Self." In the case of a network protocol policy violation such as Transmission Control Protocol ("TCP"), User Datagram Protocol ("UDP"), or Internet Control Message Protocol ("ICMP"), a firewall policy advisor (or security policy advisor) tool can modify the firewall to block the user's port and deny access to resources on this system.

Figure 4A:
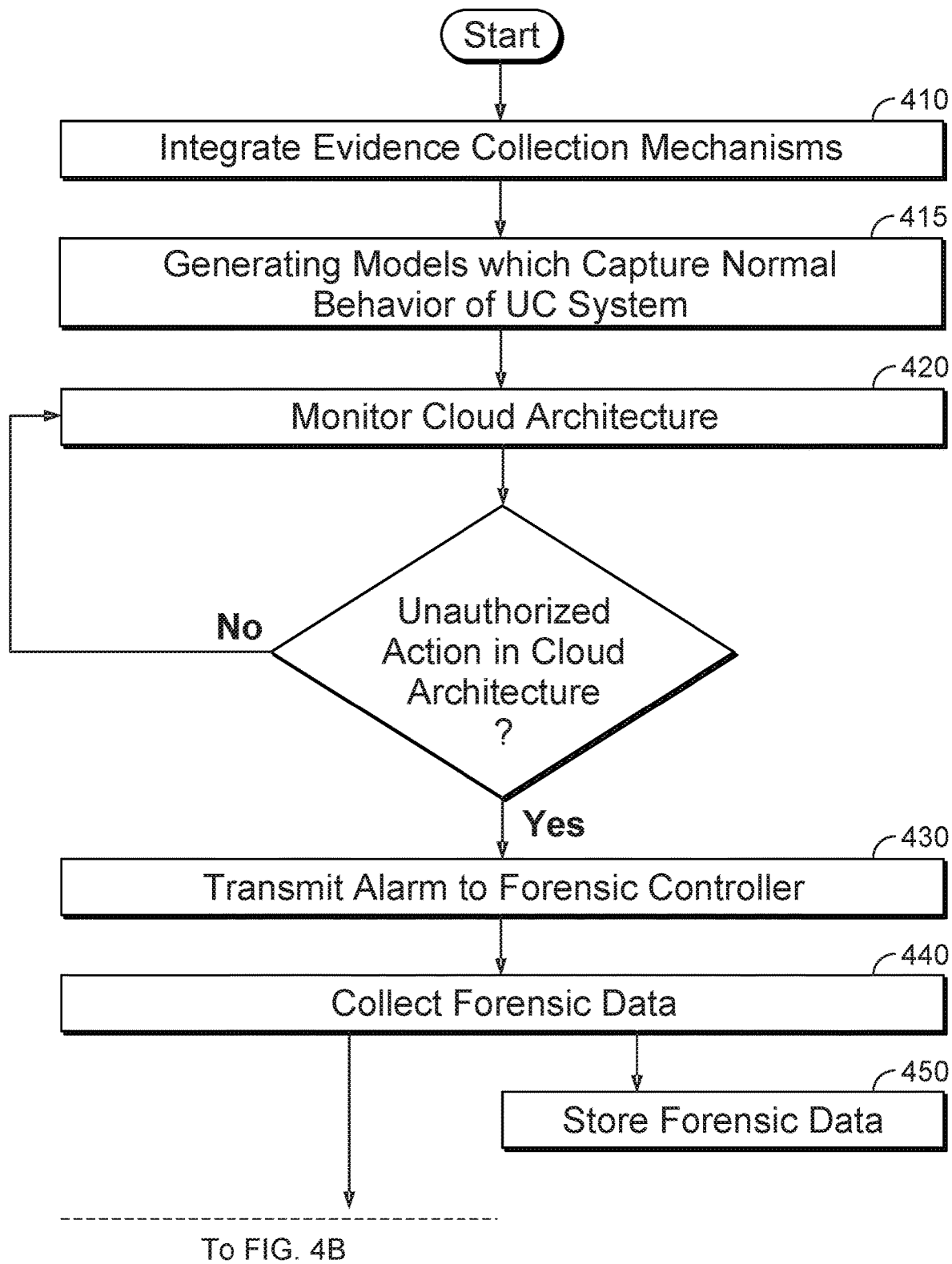
FIGS. 4A and 4B shows the steps of a method for systematic collection and analysis of forensic data in a UC system deployed in a cloud environment in accordance with the present disclosure.
Figure 4B:
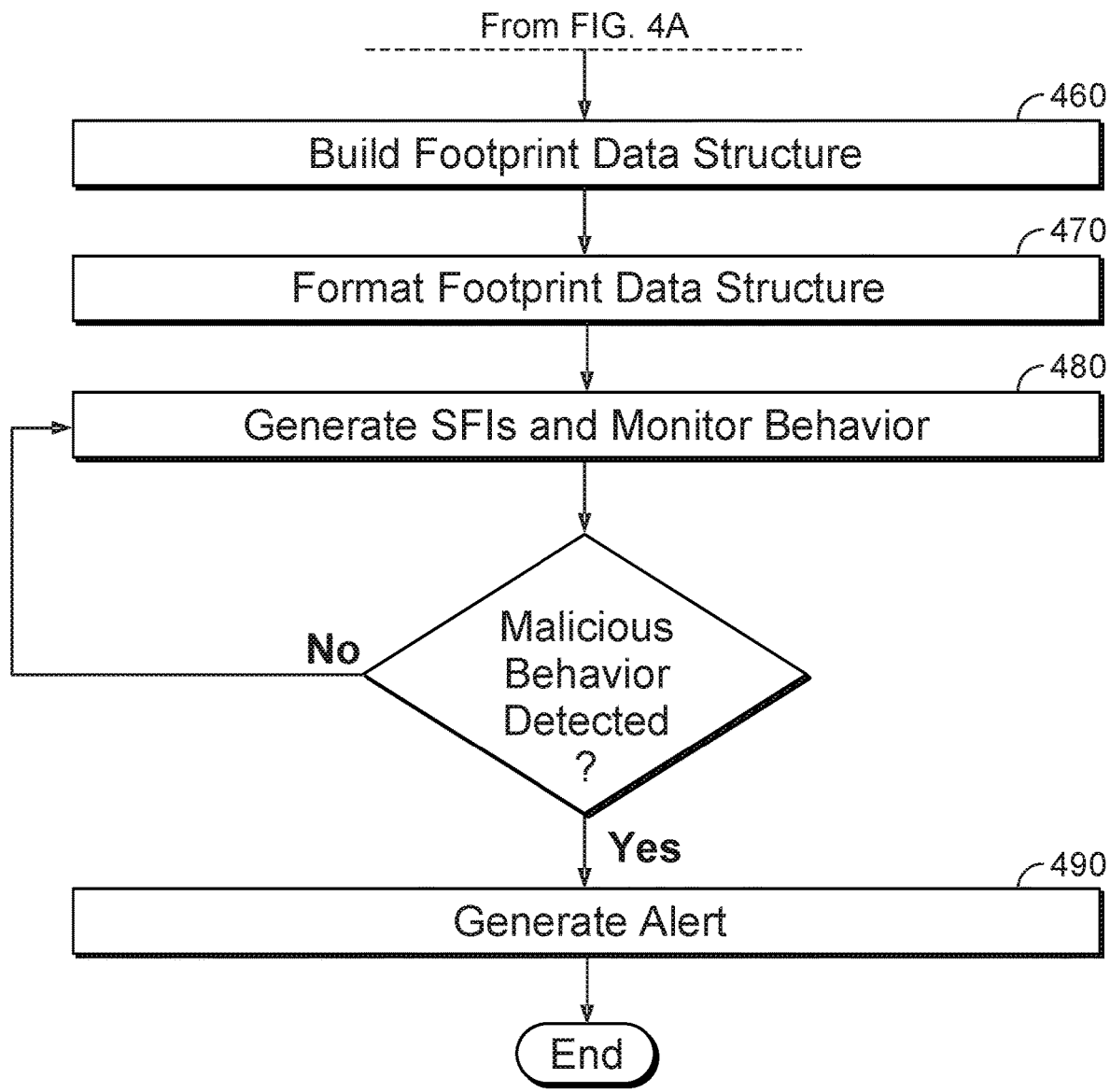

Referring now to FIGS. 4A and 4B, the process through which forensic data is collected and analyzed in accordance with the present disclosure is implemented through a sequential operation of the cloud evidence collection process and the cloud evidence analyzing process. For the cloud evidence collection process to begin, the evidence collection mechanisms are integrated in the cloud environment at step 410 to collect at least forensic data related to the behavior of UC system components. Then, using finite-state machines, models are generated which capture the normal behavior of the UC system components and their interactions at step 415. Then, using data provided by the evidence collection mechanism and the models, the IDS monitors the cloud architecture for attempts to illegally use the UC system or for a known attack against UC components at step 420. If such an attempt or attack is noted, the IDS may transmit an alarm to the forensic controller at step 430. The forensic controller in turn makes the evidence collection mechanisms start collecting all forensic data at step 440. And the forensic controller may cause the collected forensic data to be stored in the evidence database at step 450.

Once forensic data is collected, the cloud evidence analysis process can begin with the forensic controller building footprint data structures from the collected forensic data at step 460. The footprint data structures are formatted to be easily ingested by conventional forensic tools, such as EnCase or FTK, at step 470. The footprint data structures may also be used to generate SFIs which can detect any malicious behavior in UCaaS components and initiate the corresponding investigation at step 480. If malicious behavior is detected by the SFIs, the SFIs generate alerts that are sent to the forensic controller and then are stored in the alerts and policy database at step 490.

It is contemplated that the method disclosed herein may optimize forensic investigation within a SaaS based UCaaS system in which UC services are outsourced to a CSP and delivered over an IP network.

It is further contemplated that the method disclosed herein is focused on the forensic analysis of evidence retrieved from a UCaaS cloud environment. The actual forensic process (i.e. examination and analysis of UC evidence), however, may be performed using a conventional forensic system which is isolated from the cloud environment.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for systematic collection and analysis of data in a unified communications system deployed in a cloud environment, comprising the steps of:
    integrating at least one evidence collection mechanism with the unified communications system, wherein said at least one evidence collection mechanism is operative to capture forensic data related to operation of the unified communications system and at least one component in the cloud environment;
    generating at least one model which captures the normal behavior of the unified communications system;
    monitoring, by at least one intrusion detection system, the unified communications system for an occurrence of an unauthorized action using captured said forensic data and the at least one model;
    upon the occurrence of an unauthorized action, transmitting, by said at least one intrusion detection system, an alarm to a forensic controller;
    upon the transmission of the alarm to said forensic controller, collecting, by said at least one evidence collection mechanism, said forensic data;
    building, by said forensic controller, at least one footprint data structure from the collected forensic data;
    formatting said at least one footprint data structure, wherein the step of formatting enables said at least one footprint data structure to be used by at least one forensics software application tool;
    generating at least one self-forensic investigator for use to detect any malicious behavior in the unified communications system, wherein said at least one self-forensic investigator is generated using said at least one footprint data structure; and
    alerting, by said at least one self-forensic investigator, said forensic controller upon the detection of any malicious behavior in the unified communications system.

2. A method for systematic collection and analysis of data in a unified communications system deployed in a cloud environment, comprising the steps of:
    integrating at least one evidence collection mechanism with the unified communications system, wherein said at least one evidence collection mechanism is operative to capture forensic data related to operation of the unified communications system and at least one component in the cloud environment;
    generating at least one model which captures the normal behavior of the unified communications system;
    monitoring, by at least one intrusion detection system, the unified communications system for an occurrence of an unauthorized action using captured said forensic data and the at least one model;
    upon the occurrence of an unauthorized action, transmitting, by said at least one intrusion detection system, an alarm to a forensic controller, wherein said forensic controller is operatively connected to but physically and logically separate from the cloud environment;
    upon the transmission of the alarm to said forensic controller, collecting, by said at least one evidence collection mechanism, said forensic data;
    building, by said forensic controller, at least one footprint data structure from the collected forensic data;
    formatting said at least one footprint data structure, wherein the step of formatting enables said at least one footprint data structure to be used by at least one forensics software application tool;
    generating at least one self-forensic investigator for use to detect any malicious behavior in the unified communications system, wherein said at least one self-forensic investigator is generated using said at least one footprint data structure; and
    alerting, by said at least one self-forensic investigator, said forensic controller upon the detection of any malicious behavior in the unified communications system.

3. A method for systematic collection and analysis of data in a unified communications system deployed in a cloud environment, comprising the steps of:
    integrating at least one evidence collection mechanism with the unified communications system, wherein said at least one evidence collection mechanism is attached to at least one component in the cloud environment and operative to capture forensic data related to operation of the unified communications system and the at least one component the cloud environment;
    generating at least one model which captures the normal behavior of the unified communications system;
    monitoring, by at least one intrusion detection system, the unified communications system for an occurrence of an unauthorized action using captured said forensic data and the at least one model;
    upon the occurrence of an unauthorized action, transmitting, by said at least one intrusion detection system, an alarm to a forensic controller, wherein said forensic controller is operatively connected to but physically and logically separate from the at least one component in the cloud environment;
    upon the transmission of the alarm to said forensic controller, collecting, by said at least one evidence collection mechanism, said forensic data;
    storing, by said forensic controller, collected forensic data in an evidence database that is operatively connected to but physically and logically separate from the at least one component in the cloud environment;
    building, by said forensic controller, at least one footprint data structure from the collected forensic data; and
    formatting said at least one footprint data structure, wherein the step of formatting enables said at least one footprint data structure to be used by at least one forensics software application tool;
    generating at least one self-forensic investigator for use to detect any malicious behavior in the unified communications system, wherein said at least one self-forensic investigator is generated using said at least one footprint data structure; and
    alerting, by said at least one self-forensic investigator, said forensic controller upon the detection of any malicious behavior in the unified communications system.

* * * * *